United States Patent
Knigge et al.

(10) Patent No.: US 9,382,496 B1
(45) Date of Patent: Jul. 5, 2016

(54) LUBRICANTS WITH HIGH THERMAL STABILITY FOR HEAT-ASSISTED MAGNETIC RECORDING

(71) Applicant: Western Digital Technologies, Inc., Irvine, CA (US)

(72) Inventors: Bernhard Knigge, San Jose, CA (US); Mousumi Mani Biswas, Cupertino, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/231,252

(22) Filed: Mar. 31, 2014

Related U.S. Application Data

(60) Provisional application No. 61/918,110, filed on Dec. 19, 2013.

(51) Int. Cl.
*C10M 105/50* (2006.01)
*C10M 105/70* (2006.01)
*C10M 105/68* (2006.01)
*G11B 5/48* (2006.01)
*G11B 5/725* (2006.01)

(52) U.S. Cl.
CPC ........... *C10M 105/70* (2013.01); *C10M 105/50* (2013.01); *C10M 105/68* (2013.01); *G11B 5/4866* (2013.01); *G11B 5/725* (2013.01)

(58) Field of Classification Search
None
See application file for complete search history.

(56) References Cited

U.S. PATENT DOCUMENTS

| | | | |
|---|---|---|---|
| 3,442,942 A | 5/1969 | Sianesi et al. | |
| 3,650,928 A | 3/1972 | Sianesi et al. | |
| 3,665,041 A | 5/1972 | Sianesi et al. | |
| 3,810,874 A | 5/1974 | Mitsch et al. | |
| 3,847,978 A | 11/1974 | Sianesi et al. | |
| 4,113,772 A | 9/1978 | Lagow et al. | |
| 4,523,039 A | 6/1985 | Lagow et al. | |
| 6,013,161 A | 1/2000 | Chen et al. | |
| 6,063,248 A | 5/2000 | Bourez et al. | |
| 6,068,891 A | 5/2000 | O'Dell et al. | |
| 6,086,730 A | 7/2000 | Liu et al. | |
| 6,099,981 A | 8/2000 | Nishimori | |
| 6,103,404 A | 8/2000 | Ross et al. | |
| 6,117,499 A | 9/2000 | Wong et al. | |
| 6,136,403 A | 10/2000 | Prabhakara et al. | |
| 6,143,375 A | 11/2000 | Ross et al. | |
| 6,145,849 A | 11/2000 | Bae et al. | |
| 6,146,737 A | 11/2000 | Malhotra et al. | |
| 6,149,696 A | 11/2000 | Jia | |
| 6,150,015 A | 11/2000 | Bertero et al. | |
| 6,156,404 A | 12/2000 | Ross et al. | |
| 6,159,076 A | 12/2000 | Sun et al. | |
| 6,164,118 A | 12/2000 | Suzuki et al. | |

(Continued)

FOREIGN PATENT DOCUMENTS

EP    2208748    7/2010

OTHER PUBLICATIONS

Wang, et al., "Functionalization of Poly(aryl ether ether ketone) (PEEK): Synthesis and properties of Aldehyde and Carboxylic Acid Substituted PEEK", Macromolecules, 1993, pp. 5295-5302, vol. 26. (abstract only).

(Continued)

*Primary Examiner* — Kevin Bernatz

(57) ABSTRACT

Lubricants having perfluoropolyether side chains which have a high thermal stability and high shear modulus.

14 Claims, 4 Drawing Sheets

(56) References Cited

U.S. PATENT DOCUMENTS

| | | |
|---|---|---|
| 6,200,441 B1 | 3/2001 | Gornicki et al. |
| 6,204,995 B1 | 3/2001 | Hokkyo et al. |
| 6,206,765 B1 | 3/2001 | Sanders et al. |
| 6,210,819 B1 | 4/2001 | Lal et al. |
| 6,216,709 B1 | 4/2001 | Fung et al. |
| 6,221,119 B1 | 4/2001 | Homola |
| 6,248,395 B1 | 6/2001 | Homola et al. |
| 6,261,681 B1 | 7/2001 | Suekane et al. |
| 6,270,885 B1 | 8/2001 | Hokkyo et al. |
| 6,274,063 B1 | 8/2001 | Li et al. |
| 6,283,838 B1 | 9/2001 | Blake et al. |
| 6,287,429 B1 | 9/2001 | Moroishi et al. |
| 6,290,573 B1 | 9/2001 | Suzuki |
| 6,299,947 B1 | 10/2001 | Suzuki et al. |
| 6,303,217 B1 | 10/2001 | Malhotra et al. |
| 6,309,765 B1 | 10/2001 | Suekane et al. |
| 6,358,636 B1 | 3/2002 | Yang et al. |
| 6,362,452 B1 | 3/2002 | Suzuki et al. |
| 6,363,599 B1 | 4/2002 | Bajorek |
| 6,365,012 B1 | 4/2002 | Sato et al. |
| 6,381,090 B1 | 4/2002 | Suzuki et al. |
| 6,381,092 B1 | 4/2002 | Suzuki |
| 6,387,483 B1 | 5/2002 | Hokkyo et al. |
| 6,391,213 B1 | 5/2002 | Homola |
| 6,395,349 B1 | 5/2002 | Salamon |
| 6,403,919 B1 | 6/2002 | Salamon |
| 6,408,677 B1 | 6/2002 | Suzuki |
| 6,426,157 B1 | 7/2002 | Hokkyo et al. |
| 6,429,984 B1 | 8/2002 | Alex |
| 6,482,330 B1 | 11/2002 | Bajorek |
| 6,482,505 B1 | 11/2002 | Bertero et al. |
| 6,500,567 B1 | 12/2002 | Bertero et al. |
| 6,528,124 B1 | 3/2003 | Nguyen |
| 6,548,821 B1 | 4/2003 | Treves et al. |
| 6,552,871 B2 | 4/2003 | Suzuki et al. |
| 6,565,719 B1 | 5/2003 | Lairson et al. |
| 6,566,674 B1 | 5/2003 | Treves et al. |
| 6,571,806 B2 | 6/2003 | Rosano et al. |
| 6,628,466 B2 | 9/2003 | Alex |
| 6,664,503 B1 | 12/2003 | Hsieh et al. |
| 6,670,055 B2 | 12/2003 | Tomiyasu et al. |
| 6,682,807 B2 | 1/2004 | Lairson et al. |
| 6,683,754 B2 | 1/2004 | Suzuki et al. |
| 6,730,420 B1 | 5/2004 | Bertero et al. |
| 6,740,414 B2 | 5/2004 | Yatsue |
| 6,743,528 B2 | 6/2004 | Suekane et al. |
| 6,759,138 B2 | 7/2004 | Tomiyasu et al. |
| 6,778,353 B1 | 8/2004 | Harper |
| 6,795,274 B1 | 9/2004 | Hsieh et al. |
| 6,855,232 B2 | 2/2005 | Jairson et al. |
| 6,857,937 B2 | 2/2005 | Bajorek |
| 6,890,891 B1 | 5/2005 | Liu et al. |
| 6,893,748 B2 | 5/2005 | Bertero et al. |
| 6,899,959 B2 | 5/2005 | Bertero et al. |
| 6,916,558 B2 | 7/2005 | Umezawa et al. |
| 6,939,120 B1 | 9/2005 | Harper |
| 6,946,191 B2 | 9/2005 | Morikawa et al. |
| 6,967,798 B2 | 11/2005 | Homola et al. |
| 6,972,135 B2 | 12/2005 | Homola |
| 7,004,827 B1 | 2/2006 | Suzuki et al. |
| 7,006,323 B1 | 2/2006 | Suzuki |
| 7,012,160 B2 | 3/2006 | Hayashida et al. |
| 7,016,154 B2 | 3/2006 | Nishihira |
| 7,019,924 B2 | 3/2006 | McNeil et al. |
| 7,045,215 B2 | 5/2006 | Shimokawa |
| 7,070,870 B2 | 7/2006 | Bertero et al. |
| 7,090,934 B2 | 8/2006 | Hokkyo et al. |
| 7,099,112 B1 | 8/2006 | Harper |
| 7,105,241 B2 | 9/2006 | Shimokawa et al. |
| 7,119,990 B2 | 10/2006 | Bajorek et al. |
| 7,147,790 B2 | 12/2006 | Wachenschwanz et al. |
| 7,161,753 B2 | 1/2007 | Wachenschwanz et al. |
| 7,166,319 B2 | 1/2007 | Ishiyama |
| 7,166,374 B2 | 1/2007 | Suekane et al. |
| 7,169,487 B2 | 1/2007 | Kawai et al. |
| 7,174,775 B2 | 2/2007 | Ishiyama |
| 7,179,549 B2 | 2/2007 | Malhotra et al. |
| 7,184,139 B2 | 2/2007 | Treves et al. |
| 7,196,860 B2 | 3/2007 | Alex |
| 7,199,977 B2 | 4/2007 | Suzuki et al. |
| 7,208,236 B2 | 4/2007 | Morikawa et al. |
| 7,220,500 B1 | 5/2007 | Tomiyasu et al. |
| 7,229,266 B2 | 6/2007 | Harper |
| 7,235,292 B2 | 6/2007 | Hayashida et al. |
| 7,239,970 B2 | 7/2007 | Treves et al. |
| 7,252,897 B2 | 8/2007 | Shimokawa et al. |
| 7,277,254 B2 | 10/2007 | Shimokawa et al. |
| 7,281,920 B2 | 10/2007 | Homola et al. |
| 7,292,329 B2 | 11/2007 | Treves et al. |
| 7,301,726 B1 | 11/2007 | Suzuki |
| 7,302,148 B2 | 11/2007 | Treves et al. |
| 7,305,119 B2 | 12/2007 | Treves et al. |
| 7,314,404 B2 | 1/2008 | Singh et al. |
| 7,320,584 B1 | 1/2008 | Harper et al. |
| 7,329,114 B2 | 2/2008 | Harper et al. |
| 7,375,362 B2 | 5/2008 | Treves et al. |
| 7,388,035 B2 | 6/2008 | Kim et al. |
| 7,420,886 B2 | 9/2008 | Tomiyasu et al. |
| 7,425,719 B2 | 9/2008 | Treves et al. |
| 7,471,484 B2 | 12/2008 | Wachenschwanz et al. |
| 7,498,062 B2 | 3/2009 | Calcaterra et al. |
| 7,531,485 B2 | 5/2009 | Hara et al. |
| 7,537,846 B2 | 5/2009 | Ishiyama et al. |
| 7,549,209 B2 | 6/2009 | Wachenschwanz et al. |
| 7,569,490 B2 | 8/2009 | Staud |
| 7,597,792 B2 | 10/2009 | Homola et al. |
| 7,597,973 B2 | 10/2009 | Ishiyama |
| 7,608,193 B2 | 10/2009 | Wachenschwanz et al. |
| 7,632,087 B2 | 12/2009 | Homola |
| 7,656,615 B2 | 2/2010 | Wachenschwanz et al. |
| 7,659,231 B2 | 2/2010 | Tonelli et al. |
| 7,682,546 B2 | 3/2010 | Harper |
| 7,684,152 B2 | 3/2010 | Suzuki et al. |
| 7,686,606 B2 | 3/2010 | Harper et al. |
| 7,686,991 B2 | 3/2010 | Harper |
| 7,695,833 B2 | 4/2010 | Ishiyama |
| 7,722,968 B2 | 5/2010 | Ishiyama |
| 7,727,941 B2 | 6/2010 | Morrison et al. |
| 7,733,605 B2 | 6/2010 | Suzuki et al. |
| 7,736,768 B2 | 6/2010 | Ishiyama |
| 7,755,861 B1 | 7/2010 | Li et al. |
| 7,758,732 B1 | 7/2010 | Calcaterra et al. |
| 7,833,639 B2 | 11/2010 | Sonobe et al. |
| 7,833,641 B2 | 11/2010 | Tomiyasu et al. |
| 7,910,159 B2 | 3/2011 | Jung |
| 7,911,736 B2 | 3/2011 | Bajorek |
| 7,924,519 B2 | 4/2011 | Lambert |
| 7,944,165 B1 | 5/2011 | O'Dell |
| 7,944,643 B1 | 5/2011 | Jiang et al. |
| 7,955,723 B2 | 6/2011 | Umezawa et al. |
| 7,983,003 B2 | 7/2011 | Sonobe et al. |
| 7,993,497 B2 | 8/2011 | Moroishi et al. |
| 7,993,765 B2 | 8/2011 | Kim et al. |
| 7,998,912 B2 | 8/2011 | Chen et al. |
| 8,002,901 B1 | 8/2011 | Chen et al. |
| 8,003,237 B2 | 8/2011 | Sonobe et al. |
| 8,012,920 B2 | 9/2011 | Shimokawa |
| 8,038,863 B2 | 10/2011 | Homola |
| 8,057,926 B2 | 11/2011 | Ayama et al. |
| 8,062,778 B2 | 11/2011 | Suzuki et al. |
| 8,064,156 B1 | 11/2011 | Suzuki et al. |
| 8,076,013 B2 | 12/2011 | Sonobe et al. |
| 8,092,931 B2 | 1/2012 | Ishiyama et al. |
| 8,100,685 B1 | 1/2012 | Harper et al. |
| 8,101,054 B2 | 1/2012 | Chen et al. |
| 8,125,723 B1 | 2/2012 | Nichols et al. |
| 8,125,724 B1 | 2/2012 | Nichols et al. |
| 8,137,517 B1 | 3/2012 | Bourez |
| 8,142,916 B2 | 3/2012 | Umezawa et al. |
| 8,163,093 B1 | 4/2012 | Chen et al. |
| 8,171,949 B1 | 5/2012 | Lund et al. |
| 8,173,282 B1 | 5/2012 | Sun et al. |
| 8,178,480 B2 | 5/2012 | Hamakubo et al. |
| 8,206,789 B2 | 6/2012 | Suzuki |

(56) References Cited

U.S. PATENT DOCUMENTS

| | | | |
|---|---|---|---|
| 8,218,260 B2 | 7/2012 | Iamratanakul et al. |
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,354,618 B1 | 1/2013 | Chen et al. |
| 8,367,228 B2 | 2/2013 | Sonobe et al. |
| 8,383,209 B2 | 2/2013 | Ayama |
| 8,389,450 B2 | 3/2013 | Theyssen et al. |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 9,017,834 B2 * | 4/2015 | Yan .................. C07D 403/14 428/835.8 |
| 9,117,475 B2 * | 8/2015 | Nakata .............. C07C 43/225 |
| 2002/0060883 A1 | 5/2002 | Suzuki |
| 2003/0022024 A1 | 1/2003 | Wachenschwanz |
| 2004/0022387 A1 | 2/2004 | Weikle |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0202894 A1 | 10/2004 | Liu et al. |
| 2004/0209123 A1 | 10/2004 | Bajorek et al. |
| 2004/0209470 A1 | 10/2004 | Bajorek |
| 2005/0036223 A1 | 2/2005 | Wachenschwanz et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0263401 A1 | 12/2005 | Olsen et al. |
| 2006/0111250 A1 | 5/2006 | Russo et al. |
| 2006/0147758 A1 | 7/2006 | Jung et al. |
| 2006/0181697 A1 | 8/2006 | Treves et al. |
| 2006/0207890 A1 | 9/2006 | Staud |
| 2007/0070549 A1 | 3/2007 | Suzuki et al. |
| 2007/0184994 A1 | 8/2007 | Faunce |
| 2007/0245909 A1 | 10/2007 | Homola |
| 2008/0075845 A1 | 3/2008 | Sonobe et al. |
| 2008/0093760 A1 | 4/2008 | Harper et al. |
| 2009/0117408 A1 | 5/2009 | Umezawa et al. |
| 2009/0136784 A1 | 5/2009 | Suzuki et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0311557 A1 | 12/2009 | Onoue et al. |
| 2010/0143752 A1 | 6/2010 | Ishibashi et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0267597 A1 * | 10/2010 | Shimura et al. ........... 508/283 |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0097603 A1 | 4/2011 | Onoue |
| 2011/0097604 A1 | 4/2011 | Onoue |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0021253 A1 * | 1/2012 | Nakata et al. ............. 428/810 |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0156523 A1 | 6/2012 | Seki et al. |
| 2012/0164488 A1 | 6/2012 | Shin et al. |
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0225217 A1 | 9/2012 | Itoh et al. |
| 2012/0251842 A1 | 10/2012 | Yuan et al. |
| 2012/0251846 A1 | 10/2012 | Desai et al. |
| 2012/0276417 A1 | 11/2012 | Shimokawa et al. |
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |
| 2013/0107679 A1 * | 5/2013 | Huang et al. ............ 369/13.32 |
| 2013/0165029 A1 | 6/2013 | Sun et al. |
| 2013/0175252 A1 | 7/2013 | Bourez |
| 2013/0201805 A1 * | 8/2013 | Seigler et al. ............ 369/13.24 |
| 2013/0216865 A1 | 8/2013 | Yasumori et al. |
| 2013/0230647 A1 | 9/2013 | Onoue et al. |

(56) References Cited

U.S. PATENT DOCUMENTS

| | | |
|---|---|---|
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |

OTHER PUBLICATIONS

Kola, et al., "Synthesis and Characterization of a Pyromellitic Diimide-Based Polymer with C- and N-Main Chain links: Matrix for Solution-Processable n-Channel Field-effect Transistors", ACS Macro Letters, Dec. 5, 2011, pp. 1-13, vol. 1.

Zheng, et al., "Pyromellitic Diimides: Minimal Cores for High Mobility n-Channel Transistor Semiconductors", Journal of American Chemical Society, 2008, pp. 14410-14411, vol. 130.

Sandler, et al., "Chapter 9: Thermally Stable Polymers", Polymer Synthesis, vol. 1, 2nd Edition, Academic Press, Inc.

Sukumar, et al., "Functionalized Poly(benzimidazole)s as Membrane Materials for Fuel Cells," Macromolecular Chemistry and Physics, pp. 2258-2267, vol. 208. (abstract only).

"PEEK", Wikipedia, the free encyclopedia, retrieved from http://en.wikipedia.org/wiki/PEEK, Jun. 16, 2014, pp. 1-3.

Van Der Vegt, et al., "From polymers to plastics", 2006, pp. 1-18, VSSD.

Parker, et al., "Polymers, High-Temperature," Ullman's Encyclopedia of Industrial Chemistry (online version), Apr. 15, 2012, Wiley-VCH, Weinheim.

Sanders, The Effect of Synthesis Route and ortho-Position Functional Group on Thermally Rearranged Polymer Transport Properties, The University of Texas at Austin PhD. Thesis, May 2013, pp. 1-273.

Ahn, et al., "The Phase Behavior of Tetramethyl Bisphenol-A Polyarylate/Aliphatic Polyester Blends", Journal of Polymer Science: Part B: Polymer Physics, vol. 36, 1998, pp. 201-212.

Seyler, et al., "Tuning the solubility of hepta(p-benzamide)s via the monomer sequence," Tetrahedron Letters, doi: 10.1016/j.tetlet.2012.11.045, 2012.

Takagi, et al., "Synthesis and optical properties of poly(p-benzamide)s bearing oligothiophene on the amide nitrogen atom through an alkylene spacer", Polymer Journal, 2013, vol. 45, pp. 1171-1176.

\* cited by examiner

Figure 2a

| Compound | Mol. Wt. (gm/mole) | Temp. of half Decomposition (K) | Coeff. of vol. Thermal exp. | Density gm/cc | Heat Capacity Cp J/(mol K) | Surface tension dyn/cm |
|---|---|---|---|---|---|---|
| DEMNUM $[CF_3-CF_2-CF_2-O]_{12}$ | 2000.00 | 727.96 | 830.51 | 2.02 | 197.84 | 29.86 |
| FOMBLIN $[(CF_2O)_m(CF_2-CF_2-O)_n]$ | 2000.00 | 705.76 | 877.78 | 1.93 | 524.91 | 27.50 |
| Pyromellitic diimide $C_{10}H_4N_2O_4$ | 200.00 | 877.05 | 3355.71 | 1.57 | 278.13 | 63.78 |
| Pyromellitic polyimide $[C_{10}H_4N_2O_4]_{10}$ | 2000.00 | 877.05 | 3144.40 | 1.57 | 278.13 | 63.78 |
| 2, 5 benzimidazole $[C_7H_6N_2]$ | 110.00 | 864.85 | 3355.71 | 1.35 | 164.81 | 48.10 |
| (poly)-2, 5 benzimidazole $[C_7H_6N_2]_{18}$ | 2000.00 | 864.85 | 684.29 | 1.35 | 164.81 | 48.10 |
| Ether ether ketone $[C_6H_4O-C_6H_4O-C_6H_4CO]$ (polyether ether ketone) | 200.00 | 749.59 | 3355.71 | 1.23 | 443.34 | 48.38 |
| $[C_6H_4O-C_6H_4O-C_6H_4CO]_{10}$ | 2000.00 | 749.59 | 298.05 | 1.23 | 443.34 | 48.38 |
| p-tetramethyl bisphenol $[C_{19}H_{34}]$ | 250.00 | 764.46 | 3355.71 | 0.99 | 468.74 | 35.74 |
| (Poly) p-tetramethyl bisphenol $[C_{19}H_{34}]_8$ | 2000.00 | 764.46 | 292.22 | 0.99 | 468.74 | 35.74 |
| p-benzamide $C_6H_5CONH_2$ | 121.00 | 788.24 | 3355.71 | 1.29 | 186.11 | 54.48 |
| (poly)p-benzamide $[C_6H_5CONH_2]_{19}$ | 2000.00 | 788.24 | 316.60 | 1.29 | 186.11 | 54.48 |

Figure 2b

| Compound | Thermal conductivity J/(K m s) | Refractive index | Dielectric constant | Volume resistivity Ω cm | Shear modulus GPa | Activation energy for viscous flow kJ/mol |
|---|---|---|---|---|---|---|
| DEMNUM [CF$_2$-CF$_2$-CF$_2$-O]$_{10}$ | 0.16 | 1.35 | 2.26 | 2.99E+18 | 0.55 | 41.42 |
| FOMBLIN [(CF$_2$O)$_m$(CF$_2$-CF$_2$-O)$_n$] | 0.18 | 1.36 | 2.43 | 1.40E+18 | 0.44 | 36.76 |
| Pyromelitic diimide C$_{10}$H$_4$N$_2$O$_4$ | 0.00 | 1.69 | 4.43 | 1.41E+14 | 2.36 | 0.00 |
| Pyromelitic polyimide [C$_{22}$H$_{10}$N$_2$O$_4$]$_{10}$ | 0.22 | 1.69 | 4.43 | 1.41E+14 | 1.60 | 0.38 |
| 2,5 benzimidazole [C$_7$H$_5$N$_2$] | 0.00 | 1.71 | 3.65 | 4.92E+15 | 2.27 | 0.00 |
| (poly)-2,5 benzimidazole [C$_7$H$_5$N$_2$]$_{10}$ | 0.22 | 1.71 | 3.65 | 4.92E+15 | 683.27 | 30.60 |
| Ether ether ketone {C$_6$H$_4$O-C$_6$H$_4$O-C$_6$H$_4$CO} | 0.00 | 1.62 | 3.04 | 8.29E+16 | 1.59 | 0.00 |
| (poly)ether ether ketone {C$_6$H$_4$O-C$_6$H$_4$O-C$_6$H$_4$CO}$_{10}$ | 0.20 | 1.62 | 3.04 | 8.29E+16 | 690.07 | 50.04 |
| p-tetramethyl bisphenol [C$_{16}$H$_{20}$] | 0.00 | 1.59 | 2.45 | 1.26E+18 | 0.64 | 0.00 |
| (Poly) p-tetramethyl bisphenol [C$_{16}$H$_{20}$]$_{10}$ | 0.16 | 1.59 | 2.45 | 1.26E+18 | 714.37 | 46.97 |
| p-benzamide C$_6$H$_5$CONH$_2$ | 0.00 | 1.63 | 3.88 | 1.72E+15 | 1.56 | 0.00 |
| (poly)p-benzamide [C$_6$H$_5$CONH$_2$]$_{10}$ | 0.21 | 1.63 | 3.88 | 1.72E+15 | 853.38 | 36.70 |

LUBRICANTS WITH HIGH THERMAL STABILITY FOR HEAT-ASSISTED MAGNETIC RECORDING

CROSS-REFERENCE TO RELATED APPLICATIONS

This application claims the benefit of priority under 35 U.S.C. §120 from U.S. Patent Application No. 61/918,110, filed on Dec. 19, 2013 and entitled "Lubricant with High Thermal Stability for Heat-Assisted Magnetic Recording," the entire content of which is incorporated herein by reference.

BACKGROUND

Heat-assisted magnetic recording (HAMR) is a technology which allows large increases in information storage density compared to conventional hard disk drives. A laser is used to momentarily heat the recording area of the medium to reduce its coercivity below that of the applied magnetic field from the recording head. The heated region is then rapidly cooled in the presence of the applied head field whose orientation encodes the recorded data. Due to the use of heat during the recording process, lubricants used with HAMR systems must be thermally stable.

HAMR requires the heating of magnetic media to or above the Curie temperature ($T_C$), which may exceed 700° K. Lubricant molecules used on the disk interface are thus exposed to high temperatures that may cause them to degrade, causing problems for head operation and recording performance. Lubricant molecules are also exposed to high shear stress conditions during disk operation.

Conventional perfluoropolyether (PFPE) lubricants used to coat current magnetic recording media surfaces, such as Z-Dol, Z-Tetraol, DEPH, and Fomblin, may not withstand the recording temperatures used in HAMR systems. There is therefore a need for improved lubricants able to withstand high temperature and shear stress conditions.

BRIEF DESCRIPTION OF THE DRAWINGS

FIG. 2a is a table listing properties of central moieties and side chains of the present lubricants.

FIG. 2b is another table listing properties of central moieties and side chains of the present lubricants.

DETAILED DESCRIPTION

Definitions

Figure 1:
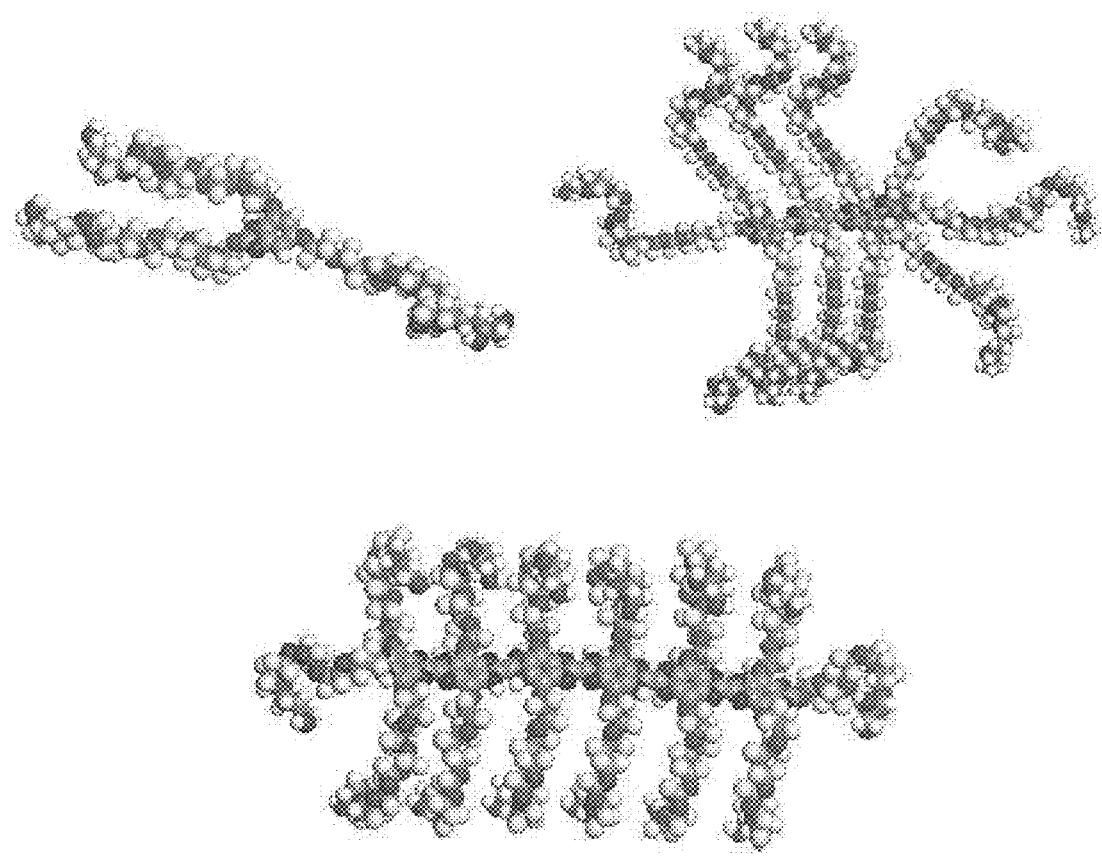
FIG. 1 illustrates several of the present novel lubricant structures with 1, 4, or 6 benzimidazole central moieties, respectively.

As used herein, the following terms and variations thereof have the meanings given below, unless a different meaning is clearly intended by the context in which such term is used.

"Central moiety" refers to a structure (a chemical moiety) to which PFPE moieties are bonded in order to form the present lubricant molecules.

"Compound" refers to a substance formed by the chemical bonding of a plurality chemical elements.

"Derivative" refers to a compound in which one or more of the atoms or functional groups of a precursor compound have been replaced by another atom or functional group, generally by means of a chemical reaction having one or more steps.

"End group" refers to an atom or functional group located at an end of a chain molecule or moiety.

"Functional group" refers to a group of atoms within a molecule which provide the molecule with a particular chemical reactivity. Examples of functional groups include a hydroxyl group, a carboxyl group, a nitro group, a perfluoro group, a phenyl group, a phosphate group, and an amino group.

"Main chain" refers to a chemical moiety to which side chains are bonded in a molecule. The central moieties of the present molecule comprise main chain moieties.

"Molecule" refers to the smallest physical unit of an element or compound, consisting of one or more like atoms in an element and two or more different atoms in a compound. A molecule can be a compound or a single atom.

"Moiety" refers to one or more covalently bonded atoms which form a part of a molecule.

"Monomer" refers to a molecule that can bind chemically to other molecules (i.e., other monomers) to form a polymer.

"Perfluoropolyether" and "PFPE" refer to alkyl ethers in which one or more hydrogen atoms are substituted with fluorine. Preferably all or a majority of alkyl hydrogen atoms are substituted with fluorine in PFPE molecules. PFPE molecules are also sometimes referred to as perfluoroalkylether (PFAE) or perfluoropolyalkylether (PFPAE) molecules.

"Perfluoropolyether moiety" and "PFPE moiety" refer to moieties comprising perfluoropolyether (PFPE) molecules. PFPE moieties are bonded to a central moiety as side chains in the present molecules.

"Polymer" refers to a molecule comprising a plurality of monomers (i.e. composed of two or more monomers).

"Side chain" refers to a chemical moiety that is chemically bonded to a main chain.

"Substituent" refers to an atom or group of atoms which are substituted in place of a hydrogen atom or other functional group on a chemical molecule, in particular on a hydrocarbon molecule.

The term "comprise" and variations of the term, such as "comprising" and "comprises," are not intended to exclude other additives, components, integers or steps. The terms "a," "an," and "the" and similar referents used herein are to be construed to cover both the singular and the plural unless their usage in context indicates otherwise.

Lubricant Compounds

The present lubricant molecules comprise one or more central moieties to which PFPE side chains are bonded. These molecules are thermally stable and have a high shear modulus, and are therefore advantageously used to lubricate heat-assisted magnetic recording (HAMR) hard disc drive (HDD) systems. These molecules additionally provide better surface coverage and are subject to less decomposition during HDD operation than current lubricants, and thus provide better reliability and an improved lifetime for HDD systems. The central moieties preferably have a molecular weight of from about 200 to 2,000 grams per mole, while the PFPE side chains preferably range from about 2,000 to 3,000 grams per mole, with higher weights being preferred for enhanced thermal stability. Monomers of the present lubricant molecules (i.e., comprising at least one central moiety and one PFPE side chain) are preferably at least 4,000 to 5,000 grams per mole.

Although the present molecules can be used as monomers to lubricate an HDD system, in a preferred embodiment a plurality of central moieties of the present molecules are bonded together in repeating units to form a polymer. Such polymers comprise at least two main chain moieties and can comprise 6 to 7 monomers or more, but more preferably comprise between 3 and 5 monomers. Preferably, the main chain moieties of the present polymers are the same, i.e. such that a given embodiment of the present lubricant is comprised of central moieties that are all the same. FIG. 1 illustrates molecules comprising 1, 4, and 6 central moieties, respectively.

Central Moieties

Formula I

The present lubricant molecules are formed from one or more central moieties to which PFPE moieties are bound as side chains. In one embodiment, the central moiety is pyromellitic diimide. Pyromellitic diimide is represented by the following formula:

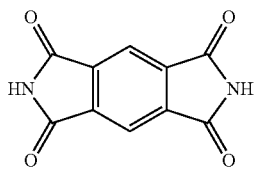 [SMILES: O=c1[nH]c(=O)c2cc3c(=O)[nH]c(=O)c3cc12]

In order to form one of the present lubricant compounds, this central moiety is substituted with PFPE moieties (described below) at one or more of the positions represented by R1-R4 in the following structure (Formula I):

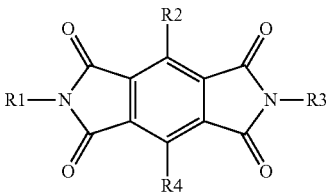

At least one of the positions represented by R1-R4 is substituted with a PFPE moiety, preferably at least two positions are substituted, and more preferably four positions are substituted. Unsubstituted positions represented by R1-R4 can be hydrogen, fluorine, or another substituent group.

Preferably, R1 and/or R3 are bound to one or more further central moieties having the structure of Formula I above in order to form a polymer molecule represented by the following structure (Formula Ia), where n is an integer of 2 or more, preferably between 3 and 10:

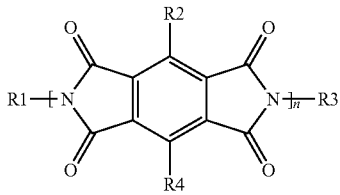

In one embodiment, a monomer of a pyromellitic diimide central moiety can comprise two PFPE side chains. Such a monomer can have the following formula, for example:
OH—$CF_2$—[$CF_2$—$CF_2$—$CF_2$—O]n-[$C_{10}H_2N_2O_4$]—[$CF_2$—$CF_2$—$CF_2$—O]n-$CF_2$—OH.

The foregoing compound can be synthesized using known methods. For example, pyromellitic dianhydride can be reacted with aliphatic or aromatic diamines in a polar solvent (DMF, DAMC, etc.) to give a polyimide. Other functional groups can then be attached using a Diels-Alder reaction (see, e.g., Kola S et al., ACS Macro Lett., 2012, 1:136-140; Zheng et al., J. Am. Chem. Soc., 2008, 130, 14410-14411; Sandler, S, Polymer Synthesis, 1974, Vol. 1 Elsevier Science pubs.).

Formula II

In another embodiment, the central moiety is 2,5 benzimidazole. 2,5 benzimidazole is represented by the following formula:

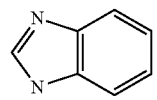

In order to form one of the present lubricant compounds, this molecule is substituted with PFPE moieties at one or more of the positions represented by R1-R6 in the following structure (Formula II):

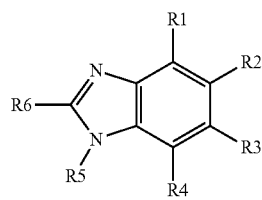

At least one of the positions represented by R1-R6 is substituted with a PFPE moiety, preferably at least two positions are substituted, more preferably three or four positions are substituted, and in some instances more than four positions are substituted with a PFPE moiety. Unsubstituted positions represented by R1-R6 can be hydrogen, fluorine, or another substituent group.

Preferably, R6 and/or R2 or R3 are bound to one or more further moieties having the structure of Formula II above in order to form a polymer molecule represented for example by the following structures (Formulas IIa and IIb), where n is an integer of 2 or more, preferably between 3 and 10:

Formula IIa

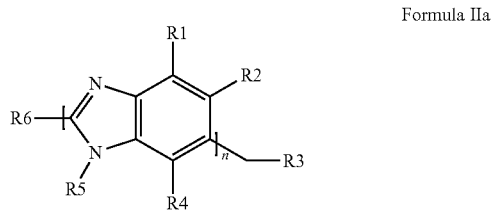

Formula IIb

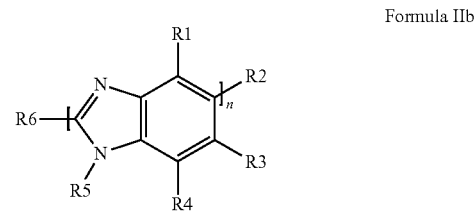

In one embodiment, a monomer of a 2,5 benzimidazole central moiety can comprise two PFPE side chains. Such a monomer can have the following formula, for example:
OH—$CF_2$—[$CF_2$—$CF_2$—$CF_2$—O]n-[$C_7H_4N_2$]—[$CF_2$—$CF_2$—$CF_2$—O]n-$CF_2$—OH.

The benzimidazole central moiety can be synthesized using known methods. For example, it can be produced through the condensation of o-phenylenediamine with formic acid, or the equivalent trimethyl orthoformate: $C_6H_4(NH_2)_2 + HC(OCH_3)_3 \rightarrow C_6H_4N(NH)CH + 3\ CH_3OH$. By altering the carboxylic acid used, this method is able to afford 2-substituted benzimidazoles.

Poly 2,5 benzimidazole can also be prepared by condensation of aromatic tetramines with aromatic dicarboxylate and other derivatives, or by heating phenyl 3,4 diamino benzoate (Sandler, S, Polymer Synthesis, 1974, Vol. 1 Elsevier Science pubs.). This reference also describes the methods to functionalize the polymer. Functionalizing of the polymer by N alkylation can be accomplished by a Suzuki-Miyara coupling reaction, as described in Sukumar, P. R. et al, Macromol Chem, Phys, 2007, 208: 2258-2267. The preparation of poly 2,5 benzimidazole is also described in U.S. Pat. No. 7,388,035.

Formula III

In another embodiment, the central moiety is 4-(4-phenoxyphenoxy)benzaldehyde (referred to herein as "ether ether ketone" for convenience). This moiety is represented by the following structure:

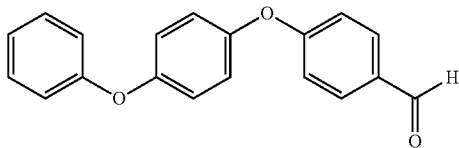 [SMILES: O=Cc1ccc(Oc2ccc(Oc3ccccc3)cc2)cc1]

In order to form one of the present lubricant compounds, this molecule is substituted with PFPE moieties at one or more of the positions represented by R1-R14 in the following structure (Formula III):

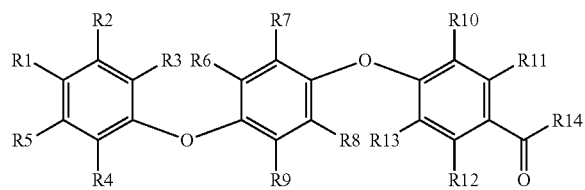

At least one of the positions represented by R1-R14 is substituted with a PFPE moiety, preferably at least two positions are substituted, more preferably three or four positions are substituted, even more preferably five or six positions are substituted, and in some instances more than six positions are substituted with a PFPE moiety. Unsubstituted positions represented by R1-R14 can be hydrogen, fluorine, or another substituent group.

Preferably, R1 and/or R14 are bound to one or more further moieties having the structure of Formula III above in order to form a polymer molecule represented by the following structure (Formula IIIa), where n is an integer of 2 or more, preferably between 3 and 10:

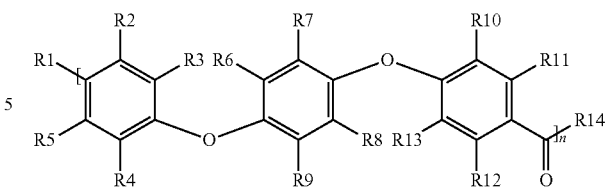

In one embodiment, a monomer of an ether ether ketone central moiety as described herein can comprise four PFPE side chains. Such a monomer can have the following formula, for example: $2\{OH-CF_2-[CF_2-CF_2-CF_2-O]n\}-[O\ C_6H_2OC_6H_4COC_6H_2]-\{[CF_2-CF_2-CF_2-O]n-CF_2-OH\}2$.

The ether ether ketone compound can be synthesized using known methods, for example through the reaction of 4,4'-difluorobenzophenone with the disodium salt of hydroquinone, which is generated in situ by deprotonation with sodium carbonate:

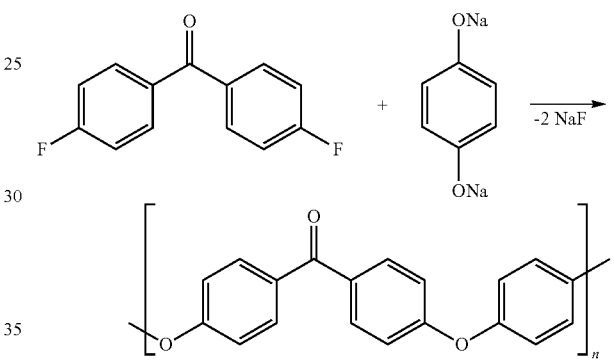

The reaction is conducted around 300° C. in polar aprotic solvents such as diphenyl sulphone.

Polymers of ether ether ketones (PEEK) can be obtained by step growth polymerization, by dialkylation of bisphenolate salts. Wang and Roovers (Macromolecules, 1993, 26:5295-5302) describes ways to functionalize aldehyde and carboxyl substituted and halogenated PEEK polymers. These methods can be used to attach DEMNUM or FOMBLIN side chains to the central moiety. European Patent No. 2208748 also describes the preparation of polyether ether ketone.

Formula IV

In another embodiment, the central moiety is 1,1'-propane-2,2-diylbis(3,5-dimethylbenzene) (referred to herein as "p-tetramethyl bisphenol" for convenience). This moiety is represented by the following structure:

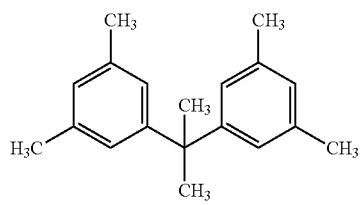

In order to form one of the present lubricant compounds, this molecule is substituted with PFPE moieties at one or more of the positions represented by R1-R24 in the following structure (Formula IV):

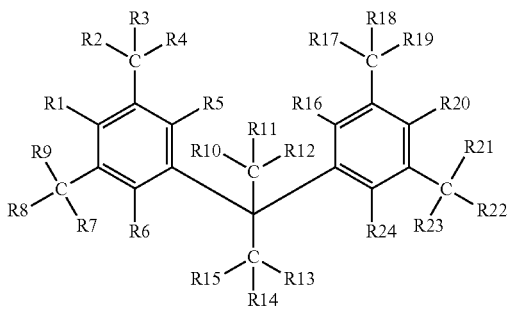

At least one of the positions represented by R1-R24 is substituted with a PFPE moiety, preferably at least two positions are substituted, more preferably three or four positions are substituted, even more preferably five or six positions are substituted, and in some instances more than six positions are substituted with a PFPE moiety. Unsubstituted positions represented by R1-R24 can be hydrogen, fluorine, or another substituent group.

Preferably, R1 and/or R20 are bound to one or more further moieties having the structure of Formula IV above in order to form a polymer molecule represented by the following structure (Formula IVa), where n is an integer of 2 or more, preferably between 3 and 10:

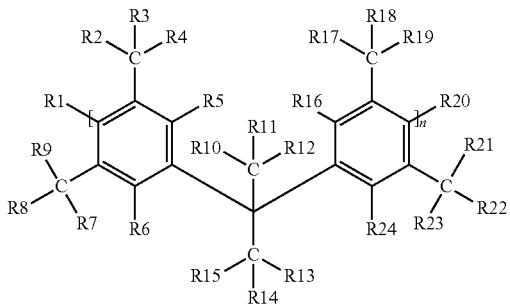

In one embodiment, a monomer of a p-tetramethyl bisphenol central moiety can comprise four PFPE side chains. Such a monomer can have the following formula, for example: 2 {OH—CF$_2$—[CF$_2$—CF$_2$—CF$_2$—O]n}-[C$_{19}$H$_{20}$]—{[CF$_2$—CF$_2$—CF$_2$—O]n-CF$_2$—OH}2.

The p-tetramethyl bisphenol compound can be synthesized using known methods. For example, tetramethyl bisphenol can be synthesized through a reaction between acetone and 2,6-dimethyl phenol in the presence of dry HCl. The polymer can be synthesized, for example by the method described by David Sander ("The Effect of Synthesis Route and ortho-Position Functional Group on Thermally Rearranged Polymer Thermal and Transport Properties," Dissertation, The University of Texas at Austin, 2013. Functional groups can be attached to the polymer by a hydrogen elimination reaction and/or by aromatic substitution reactions.

Formula V

In a further embodiment, the central moiety is represented by the following structure (referred to herein as "p-benzamide" for convenience):

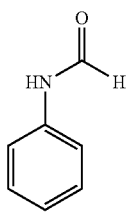

In order to form one of the present lubricant compounds, this molecule is substituted with PFPE moieties at one or more of the positions represented by R1-R7 in the following structure (Formula V):

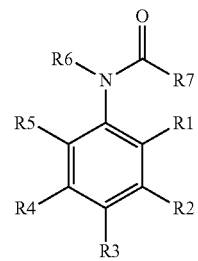

At least one of the positions represented by R1-R7 is substituted with a PFPE moiety, preferably at least two positions are substituted, more preferably three or four positions are substituted, and in some instances more than four positions are substituted with a PFPE moiety. Unsubstituted positions represented by R1-R7 can be hydrogen, fluorine, or another substituent group.

Preferably, R3 and/or R7 are bound to one or more further moieties having the structure of Formula X above in order to form a polymer molecule represented by the following structure, where n is an integer of 2 or more, preferably between 3 and 10:

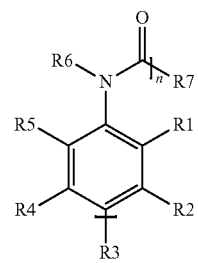

In one embodiment, a monomer of a p-benzamide central moiety can comprise four PFPE side chains. A dimer can have the following formula, for example: 2 {OH—CF$_2$—[CF$_2$—CF$_2$—CF$_2$—O]n}-([C$_6$H$_3$CONH$_2$]2)-{[CF$_2$—CF$_2$—CF$_2$—O]n-CF$_2$—OH}2.

The foregoing embodiment can be synthesized using known methods. For example, polypara-benzamide can be prepared as described by Seyler H. and Kilbinger, A. ("Tuning the solubility of hepta(p-benzamide)s via the monomer sequence," Tetrahedron Letters, 2013, 54(8):753-756), who described a method to prepare hepta (P-benzamide) and functionalize the polymer. 4-amino salicylic acid can be N-acylated by acetyl chloride, and subsequent reaction with hexyl bromide can be conducted to produce a corresponding hexyl ether and ester. Takagi, K et al., ("Synthesis and optical properties of poly(p-benzamide)s bearing oligothiophene on the amide nitrogen atom through an alkylene spacer," Polymer Journal, 2013, 45:1171-1176) described the synthesis of poly (p-benzamide)s and a process for attaching side chains.

Formula VI

In another embodiment, the central moiety is 1,5-dihydroimidazo[4,5-f]benzimidazole, represented by the following structure:

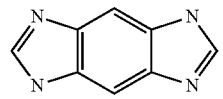 [SMILES: c1nc2cc3[nH]cnc3cc2[nH]1]

In order to form one of the present lubricant compounds, this molecule is substituted with PFPE moieties at one or more of the positions represented by R1-R6 in the following structure (Formula VI):

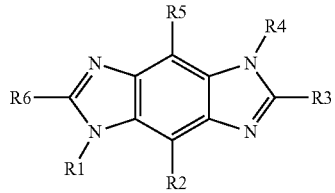

Unsubstituted positions represented by R1-R6 can be hydrogen, fluorine, or another substituent group. Preferably, R3 and/or R6 are bound to one or more further moieties having the structure of Formula VI above in order to form a polymer molecule having the structure of the following Formula VIa, where n is an integer of 2 or more, preferably between 3 and 10:

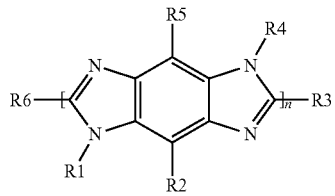

The foregoing embodiment can be synthesized using known methods.

Formula VII

In another embodiment, the central moiety is N-(4-aminophenyl)-4-(hydroxymethyl)benzamide, represented by the following structure:

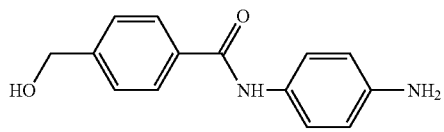 [SMILES: Nc1ccc(NC(=O)c2ccc(CO)cc2)cc1]

In order to form one of the present lubricant compounds, this molecule is substituted with PFPE moieties at one or more of the positions represented by R1-R12 in the following structure (Formula VII):

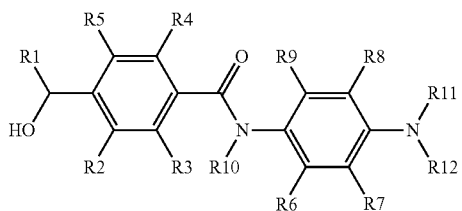

Unsubstituted positions represented by R1-R12 can be hydrogen, fluorine, or another substituent group. Preferably, R1 and/or R11 or R12 are bound to one or more further moieties having the structure of Formula VII above in order to form a polymer molecule represented by the following structures (Formulas VIIa and VIIb), where n is an integer of 2 or more, preferably between 3 and 10:

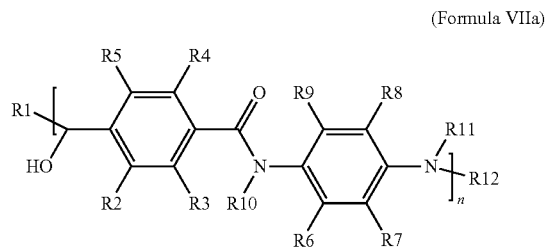

The foregoing embodiment can be synthesized using known methods.

Formula VIII

In another embodiment, the central moiety is ethylene terephthalate, represented by the following structure:

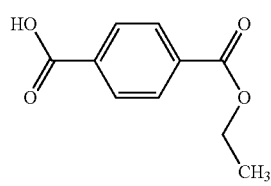

In order to form one of the present lubricant compounds, this molecule is substituted with PFPE moieties at one or more of the positions represented by R1-R10 in the following structure (Formula VIII):

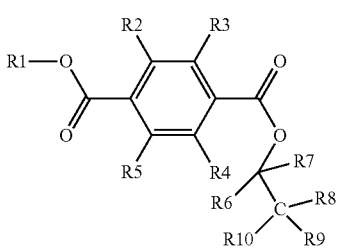

Unsubstituted positions represented by R1-R10 can be hydrogen, fluorine, or another substituent group. Preferably, R1 and/or one of R8, R9, or R10 are bound to one or more further moieties having the structure of Formula VIII above in order to form a polymer molecule represented by the following structure (Formula VIIIa), where n is an integer of 2 or more, preferably between 3 and 10 (for convenience, R10 is shown as being bound to another central moiety, but R8 or R9 could be alternatively bound instead of R10):

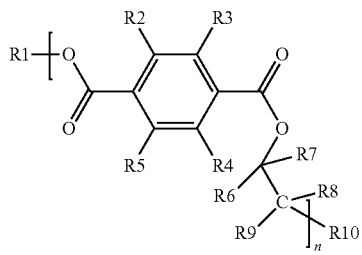

The ethylene terphthalate embodiment can be synthesized using known methods. For example, it can be produced from ethylene glycol and dimethyl terephthalate ($C_6H_4(CO_2CH_3)_2$) through a transesterification reaction, or from ethylene glycol and terephthalic acid through an esterification reaction.

Formula IX

In another embodiment, the central moiety is 1,3-diphenoxypropan-2-ol (referred to herein as "phenoxyethanol" for convenience), represented by the following structure:

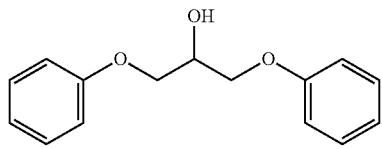 [SMILES: OC(COc1ccccc1)COc1ccccc1]

In order to form one of the present lubricant compounds, this molecule is substituted with PFPE moieties at one or more of the positions represented by R1-R16 in the following structure (Formula IX):

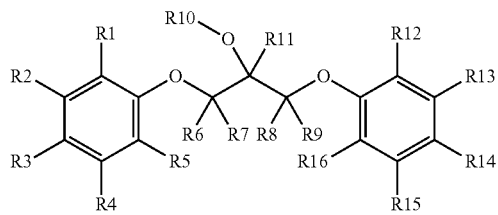

Unsubstituted positions represented by R1-R16 can be hydrogen, fluorine, or another substituent group. Preferably, R3 and/or R14 are bound to one or more further moieties having the structure of Formula IX above in order to form a polymer molecule represented by the following structure (Formula IXa), where n is an integer of 2 or more, preferably between 3 and 10:

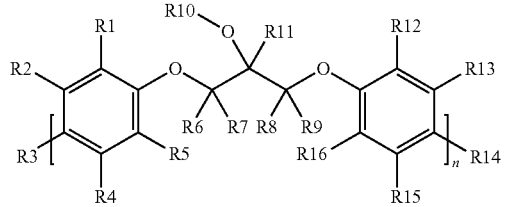

The phenoxyethanol embodiment can be synthesized using known methods.

Formula X

In another embodiment, the central moiety is butyl 3-formylbenzoate (referred to herein as "butylene isophthalate" for convenience), represented by the following structure:

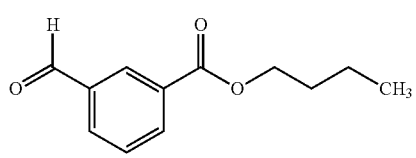

In order to form one of the present lubricant compounds, this molecule is substituted with PFPE moieties at one or more of the positions represented by R1-R14 in the following structure (Formula X):

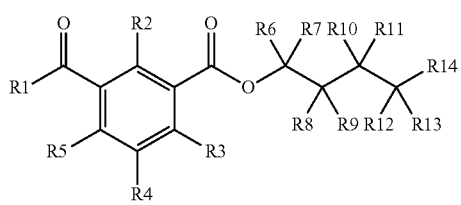

Unsubstituted positions represented by R1-R14 can be hydrogen, fluorine, or another substituent group. Preferably, R1 and/or one of R12, R13, or R14 are bound to one or more further moieties having the structure of Formula X above in order to form a polymer molecule represented by the following structure (Formula Xa), where n is an integer of 2 or more, preferably between 3 and 10:

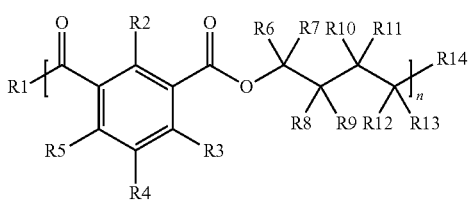

The butylene isophthalate embodiment can be synthesized using known methods, for example from dimethylisophthalate (DMIP) and 1,4-butanediol (BD) using a $Ti(OBu)_4$ catalyst.

FIGS. 2a and 2b list properties of some of the foregoing central moieties of the present lubricant molecules, both as individual molecules and as polymer chains having 8-10 repeating units. The corresponding properties of DEMNMUM and FOMBULIN PFPE polymers are also provided as reference. The properties of the present molecules are comparable and in some cases better than those of DEMNMUM and FOMBULIN. The temperature of half decomposition of the exemplified moieties does not change with the number of repeat units, but the shear modulus does change. For example, the shear modulus for a single unit of pyromellitic diimide (having a molecular weight of ~200) is 2.36, but a polymer chain having a molecular weight of 2000 has a shear modulus of 1.60. The central moieties of the present lubricant molecules have a higher shear modulus and higher half decomposition temperature compared to conventionally used PFPE lubricants such as DEMNMUM and FOMBULIN, making the present lubricants suitable for use in lubricating hard disk drives, in particular in HAMR systems.

PFPE Moieties

The perfluoropolyether (PFPE) moieties used in the present lubricant molecules can be derived from any of a number of known PFPE molecules. Methods for preparing such PFPE molecules are known to the art, and many are available commercially. PFPE molecules can be added to one or more substituent groups of the central moieties of the present molecules using known reactions and routine skill.

PFPE molecules typically have the formula $X-(T_1)_m-(T_2)_n-Y$, wherein:

$T_1$ and $T_2$, which can be the same or different from each other, are independently selected from the group consisting of $O-R_1$, $O-R_1-R_2$, $O-R_1-R_2-R_3$, and $O-R_1-R_2-R_3-R_4$, where $R_1$, $R_2$, $R_3$, and $R_4$ can each independently be $CF_2$, $CFCF_3$, or $CFCF_3-CF_2$;

m and n are an integer between 0 and 40 with at least one of m or n being a non-zero number, with m and/or n preferably between 1 and 30, more preferably between 1 and 0 or between 1 and 10, and even more preferably between 1 and 5, such as 1, 2, 3, 4 or 5;

X is a main chain moiety when the PFPE molecule is already incorporated into the present lubricant compounds, or prior to being incorporated into the present lubricant compounds is a chemical which allows the PFPE molecule to be bonded to a main chain moiety, such as a hydroxy (OH), alkoxy, or other reactive group; and Y is an atom or chemical moiety forming an end group of the perfluoropolyether moiety.

Y is typically hydrogen, a hydroxyl group, a carboxyl group, a nitro group, a perfluoro group such as $CF_3$, a phenyl group, a phosphate group, or an amino group, but can also be an alkyl, heteroalkyl, alkenyl, alkoxy, acyl, perfluoro acyl, amino, hydroxyl, or carbonyl substituent.

The following are commercially available PFPE molecules suitable for use in forming the present lubricant compounds:

TABLE 1

| Trade Name | Chemical Formula | Supplier |
|---|---|---|
| DEMNUM | $CF_3CF_2CF_2O-[CF_2CF_2CF_2O]_n-CF_2CF_2COOH$ | Daikin Industries, New York, NY |
| FOMBLIN | $HOOC-CF_2O-[CF_2CF_2O]_m-[CF_2O]_n-CF_2COOH$ | Solvay Solexis, Inc., Newark, DE |
| FOMBLIN HC | $CF_3-(O-CF_2)_m-(O-CFCF_3-CF_2)_n-CF_2COOH$ | Solvay Solexis, Inc., Newark, DE |
| FOMBLIN Z DOL | $HO-CH_2CF_2-(OCF_2CF_2)_m-(OCF_2)_n-OCF_2CH_2-OH$ | Solvay Solexis, Inc., Newark, DE |
| FOMBLIN Z-TETRAOL | $CF_2-CH_2-O-CH_2-CHOH-CH_2-O-[CF_2CF_2O]_m-[CF_2O]_n-O-CH_2-CHOH-CH_2-O-CH_2-CF_2$ | Solvay Solexis, Inc., Newark, DE |
| KRYTOX | $CF_3CF_2CF_2O-[CFCF_3CF_2O]_n-CFCF_3CF_2COOH$ | E.I. du Pont de Nemours and Company, Wilmington, DE |

In one embodiment, the PFPE side chain moieties can comprise a DEMNUM derivative, such as a compound having the formula $X-(CF_2CF_2CF_2O)_n-CF_2CF_2CH_2-Y$, where X is the main chain moiety and Y is an end group such as a carboxyl moiety or one or more hydroxyl groups. In another embodiment, the PFPE side chain moieties can comprise a FOMBLIN derivative such as $X-CF_2O-[CF_2CF_2O]_m[CF_2O]_n-CF_2CH_2-Y$, where X is the main chain moiety and Y is an end group. Alternatively, the PFPE side chain moieties can comprise a compound having the formula $Y-CH_2CF_2-(OCF_2CF_2)_m-(OCF_2)_n-OCF_2CH_2-X$, where X is the main chain moiety and Y is an end group.

Perfluoropolyether molecules having at least one hydroxyl group can be obtained commercially, or can be produced by photoinitiated oxidative polymerization of per(halo)fluoromonomers, as described in for example in U.S. Pat. No. 3,442,942; U.S. Pat. No. 3,650,928; and U.S. Pat. No. 3,665,041. Typically, mixtures of perfluoropolyethers can be obtained by combination of hexafluoropropylene and/or tetrafluoroethylene with oxygen at low temperatures, in general below −40° C., under U.V. irradiation, at a wavelength (λ) of less than 3000 A. Subsequent conversion of end-groups can be carried out on crude products from photooxidation reaction for obtaining derivatives (PFPE-OH), as described in U.S. Pat. No. 3,847,978 and in U.S. Pat. No. 3,810,874. As an alternative, functional PFPEs can be obtained by fluorination and simultaneous fragmentation of hydrogenated polyethers such as polyethylene oxide, as described in U.S. Pat. No. 4,113,772 or in U.S. Pat. No. 4,523,039.

Attaching PFPE moieties to main chain moieties can be accomplished using known methods, either at the monomer level, after polymerization of main chain moieties, or using a combination of these two methods (see, e.g., Wang and Roovers, Macromolecules, 1993, 26:5295-5302). Preferably, the central moieties are first polymerized to a desired repeat unit level and the PFPE moieties are then attached.

The present lubricant compounds are thermally stable and have a high shear modulus, resulting in decreased decomposition during hard disk drive operation and thus better reliability and an improved lifetime for the disc drives with which the present compounds are used. They also provide better surface coverage than currently used lubricants for heat-assisted magnetic recording, and have improved optical properties and dielectric constants.

Heat-Assisted Magnetic Recording

The present lubricant compounds are advantageously used in hard disk drive assemblies, in particular in hard disk drives which employ heat-assisted magnetic recording (HAMR) and/or energy-assisted magnetic recording (EAMR). Such assemblies typically comprise a hard disk that spins at a standard rotational speed within a housing. A head gimbal assembly (HGA), comprising an actuator arm or slider having a magnetic read/write transducer or head for reading/writing information to or from a location on the disk, extends over the disk within the housing.

Figure 3:
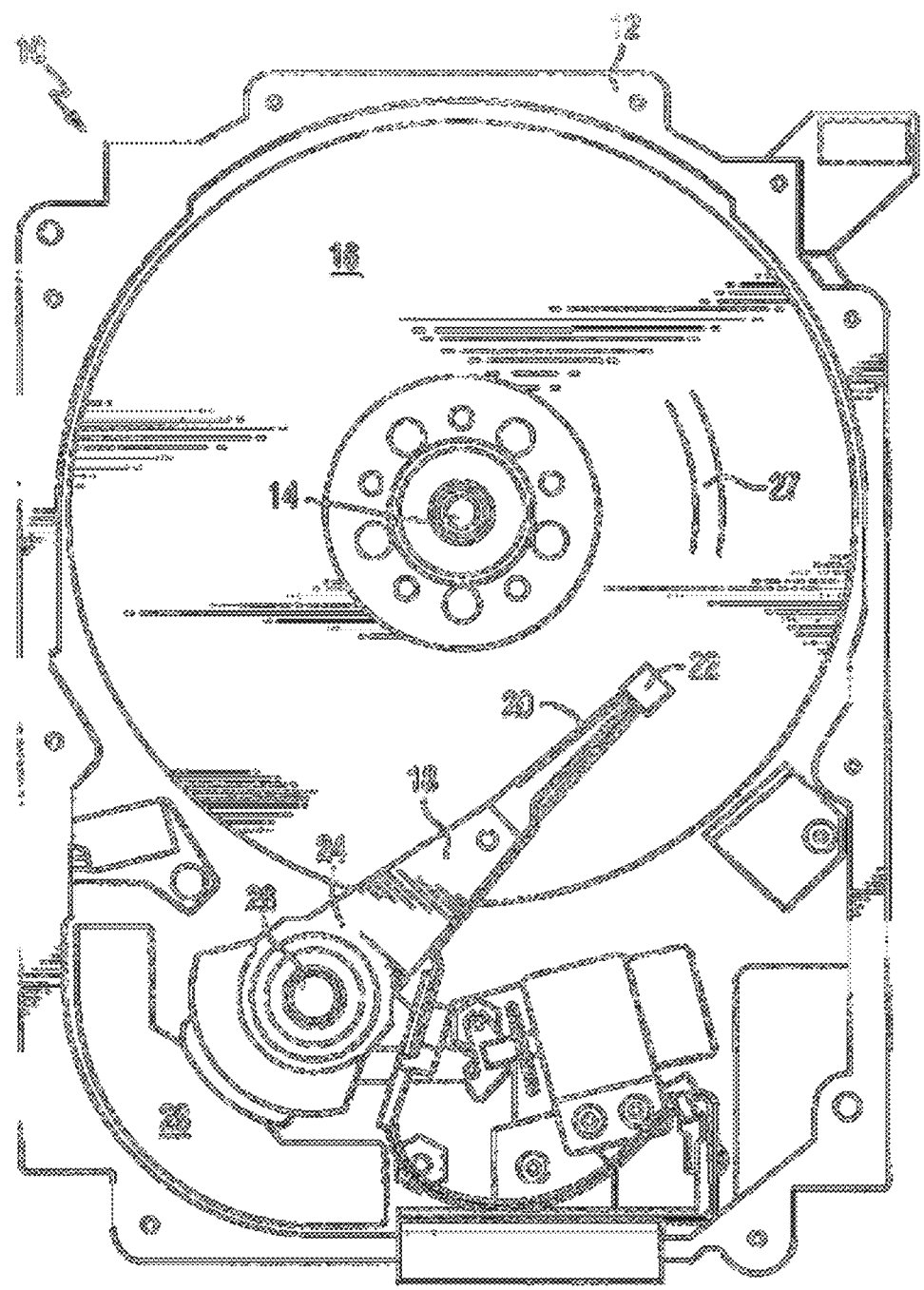
FIG. 3 is a top plan view of a hard disc drive with which the present lubricants can be used.

FIG. 3 illustrates a data storage device in the form of a disk drive 10 with which the present lubricants can be used. The disc drive 10 includes a housing 12 (with the upper portion removed and the lower portion visible in this view) sized and configured to contain the various components of the disc drive. The disc drive 10 in this example includes a spindle motor 14 for rotating at least one data storage medium 16, preferably a magnetic recording medium, within the housing 12. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired track 27 of the disc 16. The actuator motor 28 is regulated by a controller, which is not shown in this view and is well-known in the art. The disc drive 10 typically comprises a plurality of stacked discs, all of which are rotated by the spindle motor 14. While FIG. 3 shows a particular disc drive, the invention is not limited to use in any particular type of data storage device.

In heat assisted magnetic recording (HAMR), the recording head comprises a laser operable to heat the disk while writing data to the disk. The data storage medium 16 is locally heated above the Curie temperature of the medium to reduce the coercivity of the medium, so that the applied magnetic writing field can more easily direct the magnetization of the media during the temporary magnetic softening of the media caused by the heat source. Temperatures of above 600 K or above 700 K may be induced in the data storage medium of the disk. An electromagnetic wave of, for example, visible, infrared or ultraviolet light from a laser can be directed from the recording head 22 onto a surface of the data storage medium 16 to raise the temperature of a localized area of the medium. Recent designs of HAMR recording heads include a thin film waveguide on a slider to guide light to the storage medium for localized heating of the storage medium. To launch light into the waveguide, a grating coupler can be used.

The present lubricant is preferably applied onto the surfaces of the hard discs, in particular between the discs and the head gimbal assembly, in order to protect the discs from incidental contact with the HGA. For example, the lubricant can be applied to the recording disks by dip coating, spin coating or vapor lubrication. In use, the present lubricant is applied to at least the upper surface of each recording disk of the hard disk drive, and the disk drive is assembled as described above. The recording discs can then be rotated by the spindle motor and data can be recorded on them. The presence of the lubricant on the recording disks helps to prevent or minimize any damage to a disk due to contact with the recording head or other portion of the HGA.

Although the present invention has been described in considerable detail with reference to certain preferred embodiments, other embodiments are possible. The steps disclosed for the present methods, for example, are not intended to be limiting nor are they intended to indicate that each step is necessarily essential to the method, but instead are exemplary steps only. Therefore, the scope of the appended claims should not be limited to the description of preferred embodiments contained in this disclosure.

Recitation of value ranges herein is merely intended to serve as a shorthand method for referring individually to each separate value falling within the range. Unless otherwise indicated herein, each individual value is incorporated into the specification as if it were individually recited herein. All references cited herein are incorporated by reference in their entirety.

What is claimed is:

1. A perfluoropolyether lubricant compound comprising:
(a) one or more main chain moieties, wherein the one or more main chain moieties are selected from the group consisting of molecules represented by the following formulas:

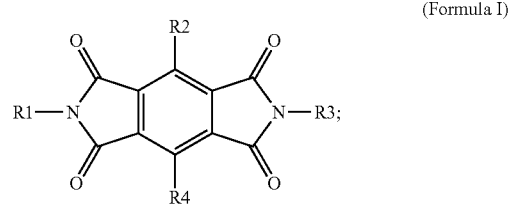
(Formula I)

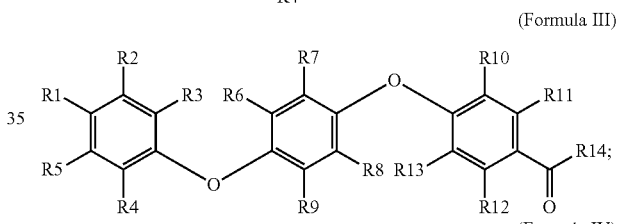
(Formula III)

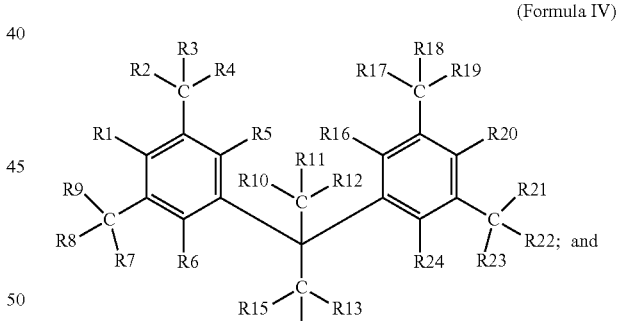
(Formula IV)

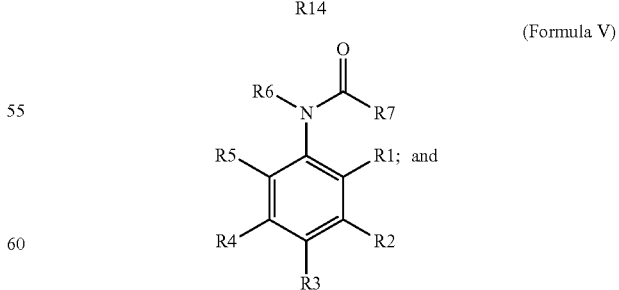
(Formula V)

(b) at least one perfluoropolyether moiety,
wherein the following positions of the main chain moieties can be a perfluoropolyether moiety or another main chain moiety:

R1 and R3 of Formula I;
R1, R7, R9, and R14 of Formula III;
R1 and R20 of Formula IV; and
R3 and R7 of Formula V, and
wherein the main chain moieties are selected from the group consisting of molecules represented by the formulas of Formula I, Formula III, Formula IV, and Formula V,
wherein the remaining positions R1-R24 are independently H or fluorine, and
wherein the perfluoropolyether moiety is derived from perfluoropolyether molecules selected from the group consisting of compounds having the following formulas:

CF3CF2CF2O—[CF2CF2CF2O]n-CF2CF2COOH, (i)

HOOC—CF2O—[CF2CF2O]m-[CF2O]n-CF2COOH, (ii)

CF3-(O—CF2)m-(O—CFCF3-CF2)n-CF2COOH, (iii)

HO—CH2CF2-(OCF2CF2)m-(OCF2)n-OCF2CH2-OH, (iv)

CF2-CH2-O—CH2-CHOH—CH2-O—[CF2CF2O]m-[CF2O]n-O—CH2-CHOH—CH2-O—CH2-CF2, and (v)

CF3CF2CF2O—[CFCF3CF2O]n-CFCF3CF2COOH, (vi)

where m and n are integers between 0 and 40 with at least one of m or n being a non-zero number.

2. The compound of claim 1, wherein at least two substituents on each main chain moiety are perfluoropolyether moieties.

3. The compound of claim 1, wherein the perfluoropolyether lubricant compound comprises at least two main chain moieties.

4. The compound of claim 3, wherein the main chain moieties are the same.

5. The compound of claim 1, wherein the compound has a plurality of main chain moieties represented by Formula I and is represented by the following formula:

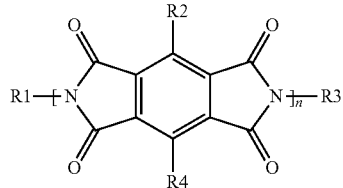

wherein n is an integer of 2 or more.

6. The compound of claim 1, wherein the compound has a plurality of main chain moieties represented by Formula III and is represented by the following formula:

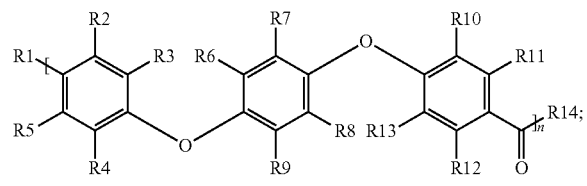

wherein n is an integer of 2 or more.

7. The compound of claim 1, wherein the compound has a plurality of main chain moieties represented by Formula IV and is represented by the following formula:

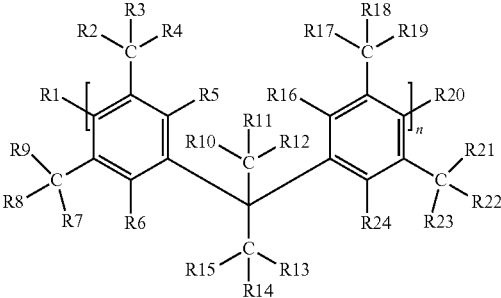

wherein n is an integer of 2 or more.

8. The compound of claim 1, wherein the compound has a plurality of main chain moieties represented by Formula V and is represented by the following formula:

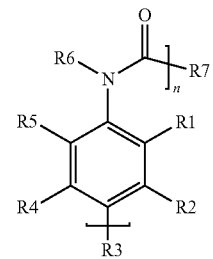

wherein n is an integer of 2 or more.

9. The compound of claim 1, wherein the compound has a molecular weight of at least about 4000.

10. A method of operating a hard disk drive, comprising the steps of:
(a) providing a hard disk drive comprising:
a plurality of stacked magnetic recording disks rotatably mounted on a spindle, each disk having an upper surface and a lower surface; and
a head gimbal assembly extending over the upper surface of each disk, the head gimbal assembly comprising a recording head;
(b) providing the lubricant of claim 1 on at least the upper surface of each recording disk of the hard disk drive; and
(c) rotating the plurality of stacked magnetic recording disks in order to allow data to be read or recorded on one or more of the disks.

11. The method of claim 10, wherein the recording head of at least one head gimbal assembly of the hard disk drive comprises a laser, and wherein the laser heats the disk above the Curie temperature of the disk while writing data to the disk.

12. The method of claim 11, wherein the laser heats the disk above 600 K.

13. The method of claim 11, wherein the laser emits light having a wavelength with a range selected from the group consisting of visible light, infrared light, and ultraviolet light.

14. The method of claim 10, wherein the lubricant of claim 1 is provided on the recording disks by dip coating, spin coating or vapor lubrication.

* * * * *